Patented Jan. 18, 1944

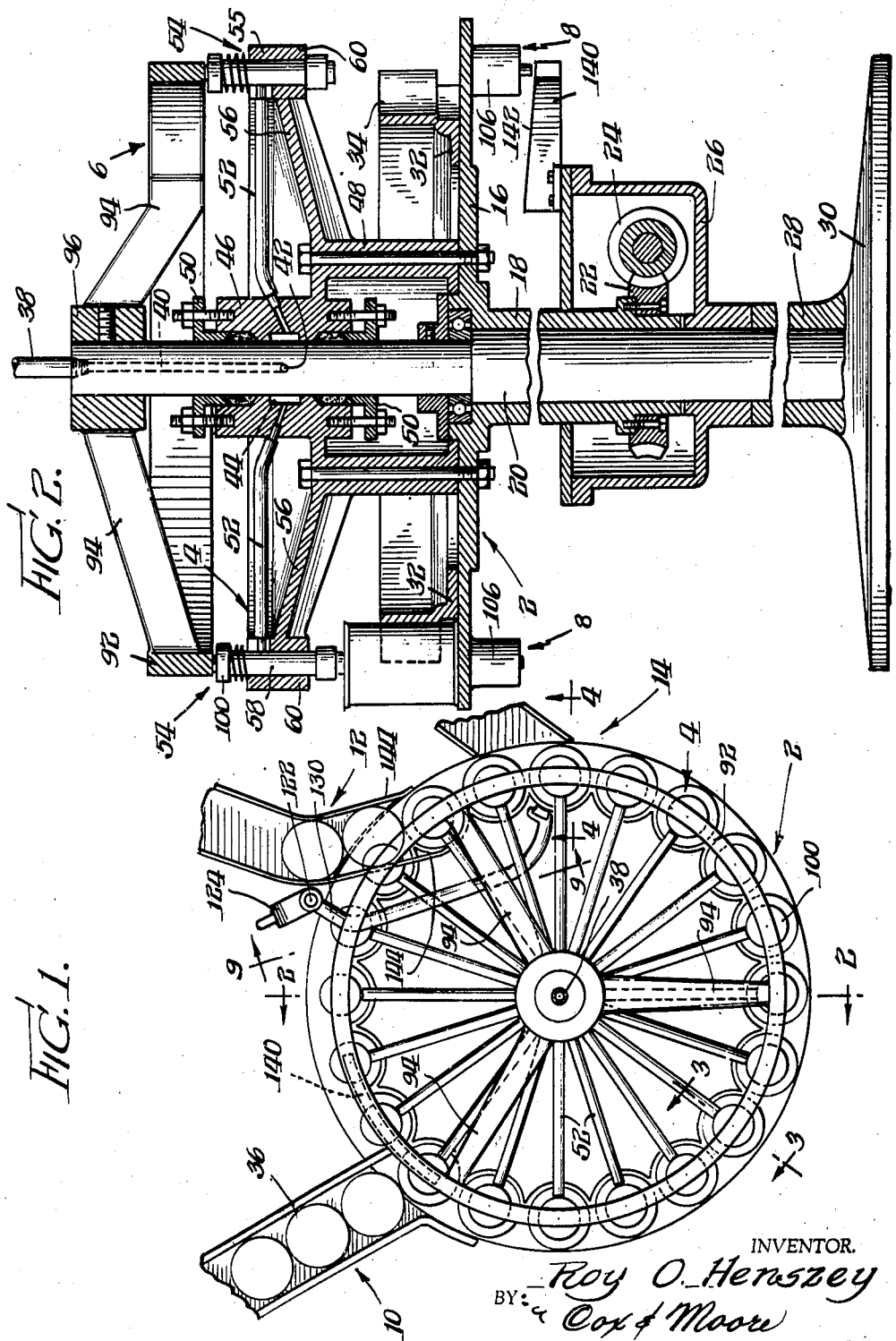

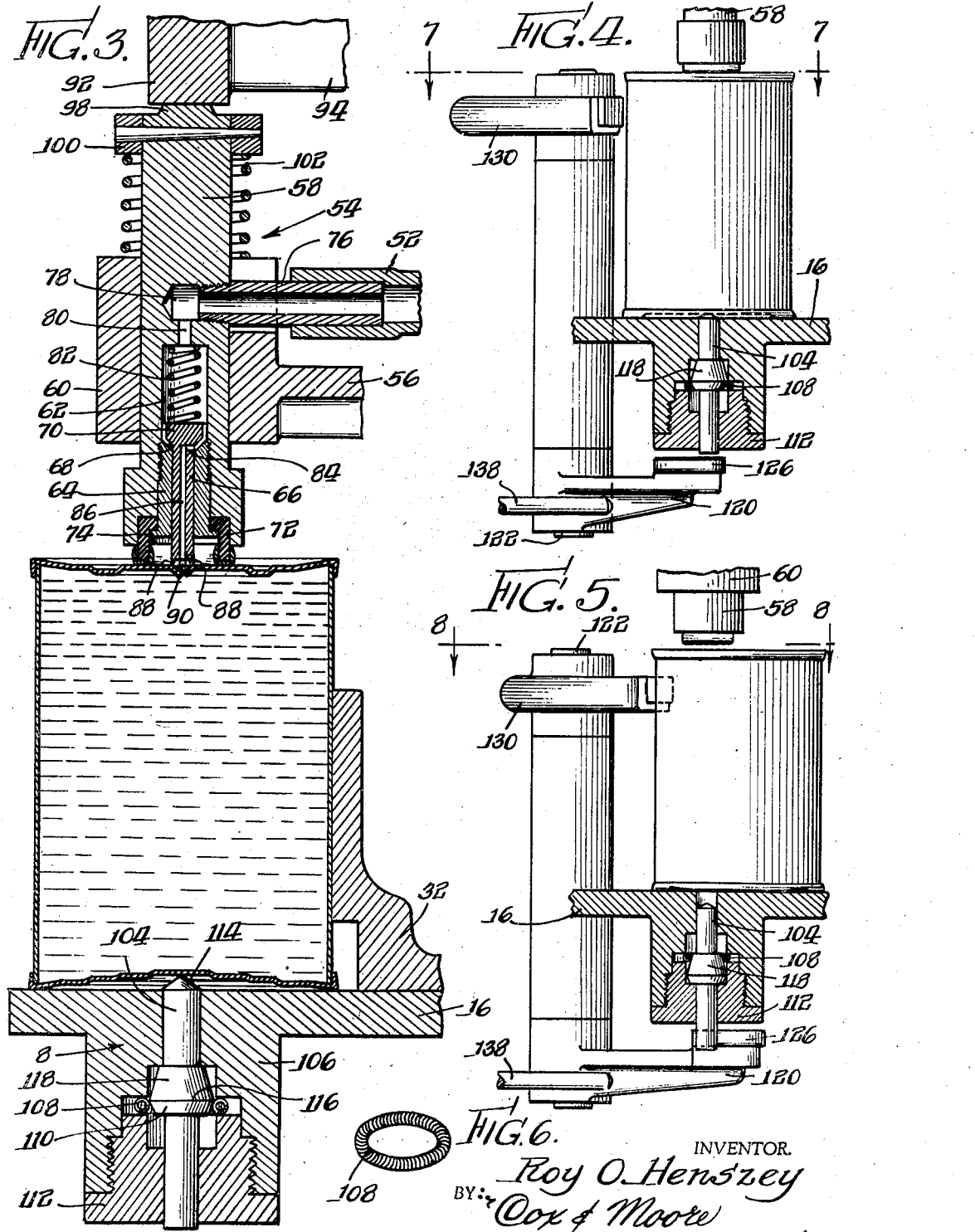

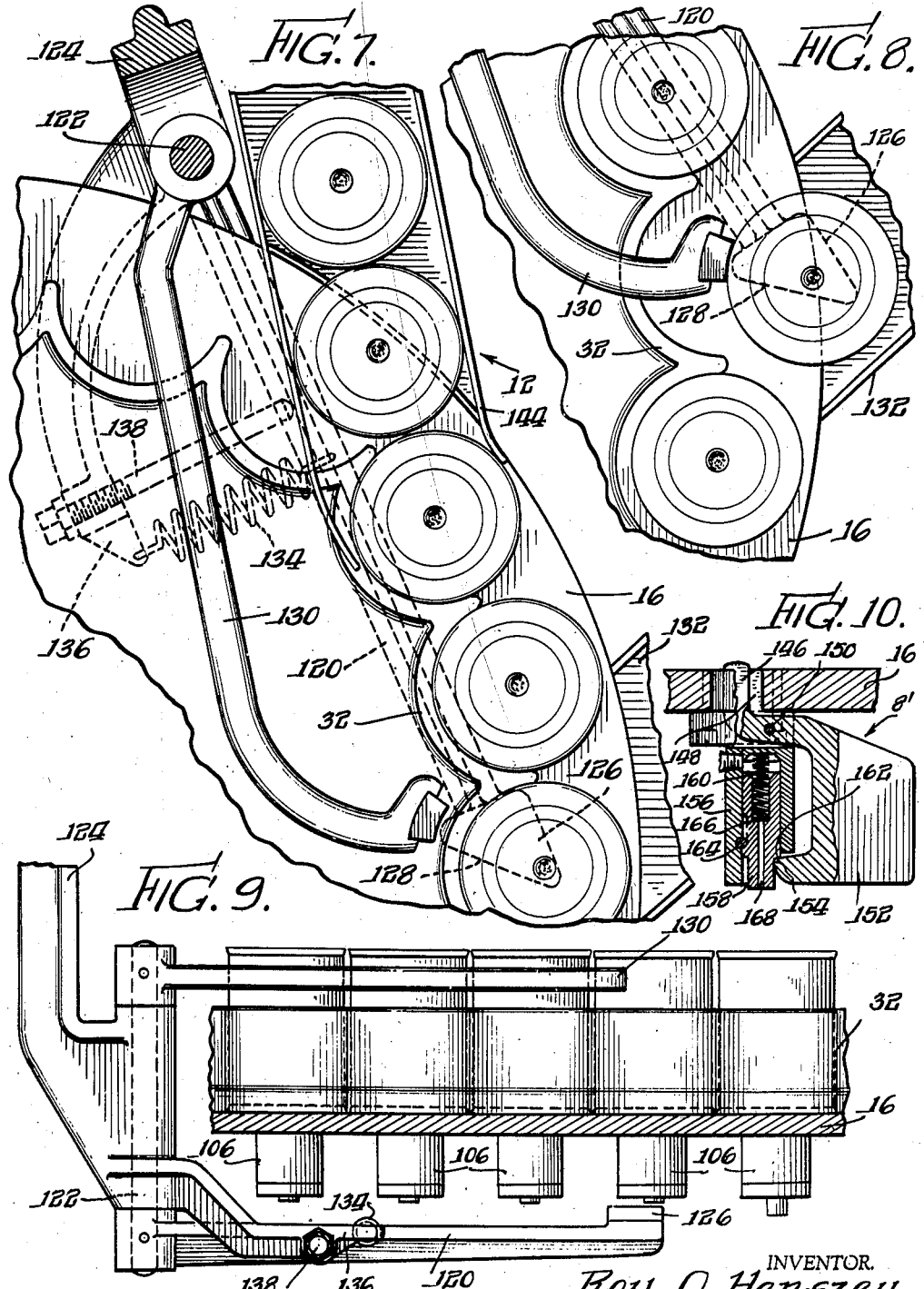

2,339,639

UNITED STATES PATENT OFFICE 2,339,639

CAP LEAK DETECTOR

Roy O. Henszey, Oconomowoc, Wis., assignor to Carnation Company, Oconomowoc, Wis., a corporation of Delaware Application June 14, 1939, Serial No. 279,023

12 Claims. (Cl. 73—51)

This invention relates to a cap leak detector for filled cans.

In the canning industry the product is put in containers such as tin cans through a small opening in the top of the can, and after the can has been filled, this small opening or vent hole is then sealed by a drop of hot solder. The container must be sealed airtight to prevent bacteria, foreign matter, or air from entering the container and spoiling the contents or product. Occasionally for one reason or another the drop of solder which is intended to form the sealing cap of the can fails to effect the complete sealing of the can. The consequent spoilage of the product is a great source of annoyance and expense both to the industry and to the consuming public. It is accordingly an object of this invention to provide a simple and economical machine for testing filled cans to determine whether a leak exists between the sealing cap and the container and to reject those cans which have not been hermetically sealed.

Another object of the invention is to provide a machine utilizing a gas, preferably air under pressure, to detect cans which have not been hermetically sealed in the process of packaging a commodity.

Applicant's invention further contemplates provision of means exerting upon a container in a region about its sealing cap a pressure different from the pressure internally of the container to detect the presence of a leak between the container and its sealing cap, to cause a deflection of some part of the container and to control by means of this deflected portion of the can a control instrumentality which through a motivating mechanism automatically rejects such cans.

Other and further objects and advantages of the invention will be apparent from the following description when taken in connection with the accompanying drawings wherein Fig. 1 is a fragmentary plan view of a machine embodying a mechanism constructed in accordance with the invention.

Fig. 2 is a vertical section taken substantially along the line 2—2 of Fig. 1.

Fig. 3 is an enlarged vertical fragmentary section taken along the line 3—3 of Fig. 1.

Fig. 4 is an enlarged fragmentary vertical section along the line 4—4 of Fig. 1

Fig. 5 is a view similar to Fig. 4 for illustrating operation of this portion of the mechanism.

Fig. 6 is a perspective view of a pin actuating and detaining spring forming part of the mechanism.

Fig. 7 is an enlarged fragmentary horizontal section taken substantially along the line 7—7 of Fig. 4.

Fig. 8 is an enlarged fragmentary section taken along the line 8—8 of Fig. 5.

Fig. 9 is a fragmentary vertical section taken substantially along the line 9—9 of Fig. 1.

Fig. 10 is a fragmentary view in elevation and partly in section showing a modified form of feeler device.

As shown in the drawings a mechanism embodying the invention comprises a can receiving turret or test conveyor 2, means 4 for exerting upon the container a pressure different from the internal pressure of the container specifically shown as means for supplying gas under pressure to the cap of the container, means 6 for controlling the gas supplying means 4, a can testing and control device or feeler 8, means 10 for supplying filled cans to be tested to the turret or test conveyor 2, means 12 for receiving and discharging properly sealed cans from the turret or test conveyor, and means 14 for rejecting or discharging defective or improperly sealed cans from the turret or test conveyor.

The turret or test conveyor 2 comprises a large disc or rotating table 16 carried by a sleeve 18 journaled on an upstanding stationary shaft 20. The sleeve 18 and the table 16 are rotated by means of any suitable power source, such as an electric motor (not shown), which drives a worm wheel 22 secured to the lower end of the sleeve 18 through a worm 24. The worm 24 and the worm wheel 22 may be mounted in a lubricant containing housing 26 surrounding the shaft 20 and receiving the lower end of the sleeve 18, the housing 26 being supported on an upstanding hollow post 28 of the base 30, which post receives and is secured to the stationary shaft 20.

The table 2 carries a bracket 32 forming a plurality of angularly spaced arcuate pockets 34 for receiving the cans to be tested and positioning each can in vertical alignment with a testing and control device or feeler 8.

Cans are fed to the turret or test conveyor 2 by the supply means 10 which comprises any suitable form of conveyor feeding the cans along the channel 36 onto the upper surface of the table 16 and into the pockets 34.

The means 4 for applying gas, preferably air under pressure, to the sealing cap of each container, comprises a supply pipe 38 connected to an axially extending opening 40 in the stationary shaft 20, which is connected by radial port 42 to an annular space 44 of a ring or sleeve 46 formed on a casting 48 bolted or otherwise secured to and extending upwardly from the table 16. The ring or sleeve 46 is sealed at its opposite ends by the stuffing boxes 50. Angularly spaced radially extending pipes 52 connect the annular space 44 to testing units 54, of which there is one vertically aligned with each pocket 34, and each feeler 8. The test units 54 are carried by a ring 55 supported by angularly spaced radially extending arms 56 of the casting 48.

Each test unit 54 preferably comprises as best shown in Fig. 3 a rod or pin 58 slidably mounted for vertical movement in a sleeve 60 formed with the ring 55. The rod or pin 58 is provided at its lower end with an axially extending opening or chamber 62 in which is threaded a sleeve 64 slidably receiving a valve rod 66, which sleeve is provided at its upper end with the valve seat 68 for the valve 70 formed at the upper end of rod 66. A rubber cup 72 is secured to the bottom of the rod or pin 58 as by means of the annular flange 74 of the sleeve 64.

Air is supplied to the chamber 62 from the pipe 52 by means of the flexible hose or nipple 76 through the radial opening 78 in the pin or rod 58, which opening is connected to the chamber 62 by the axially extending opening 80. The valve 70 is normally retained in closed position against its seat 68 by means of the pressure of the gas or air in the chamber 62, which pressure is preferably between five and twenty pounds per square inch, and by a coil spring 82 in the chamber 62 and interposed between the valves 70 and the upper wall of this chamber. Air under pressure is supplied to the cap 72 from the chamber 62 when the cap is in engagement with the top of the can, by means of the valve rod 66, which for this purpose is provided with a radial port 84 beneath the valve head 70, an axial port or opening 86 and transverse ports 88 at the lower end of the rod, the ports 88 being formed by intersecting slots at the lower end of the rod so the rod engages the can at four spaced points but with no bearing near the center of the solder cap as this might seal off an existing leak in the cap. The valve rod 66 is moved against the force of the spring 82 and the pressure of the air in the chamber 62 by the can being tested when the tip of the valve rod engages the sealing cap or solder pellet 90.

The testing unit 54 is moved downwardly to cause the valve rod 66 to engage the sealing cap 90 by the control means 6, which comprises a circular stationary cam 92 secured to the upper end of the stationary shaft 20 as by the integrally formed radial arms 94 and hub 96, the lower edge of the cam 92 being inclined to cause and permit an upward and downward movement of the testing units as the table 16 rotates. This lower cam edge of the cam 92 engages a button 98 formed at the upper end of the rod 58. A collar 100 is pinned to the upper end of the rod 58. A coil spring 102 encircling the rod 58 and interposed between the upper edge of the sleeve 60 and the collar 100 urges the rod upwardly and maintains the button 98 in engagement with the cam surface of the cam 92.

The can testing and control device or feeler 8 comprises a plurality of angularly spaced pins or plugs 104 vertically aligned with the axes of the pockets 34 and the axes of the rods 58 of the testing units 54. Each pin or plug 104 is slidably mounted in the depending boss 106 formed on the table 16 and is normally retained in position projecting slightly above the upper surface of the table 16 by means of the coiled annular spring 108 (Fig. 6), which normally embraces the enlarged frusto-conical portion 110 of the pin 104. The spring 108 is retained in the position shown in Fig. 3 by the cap or plug 112 threaded into the lower end of the boss 106 and apertured to slidably receive the lower end of the pin 104. The tip or portion 114 of the pin 104 which extends above the upper surface of the table 16 is beveled as shown to permit ready movement of the can from the channel 36 thereabove and into the receiving pocket 34. It will be evident that if a leak exists between the sealing cap 90 and the top of the container, air under pressure will be forced into the container and will so increase the internal pressure of the container as to cause a downward deflection or bulging of the bottom wall of the container. This downward deflection of the bottom wall of the container will cause a corresponding downward movement of the pin 104. The pin 104 moves downwardly only a slight distance under the action of this deflected can wall, but sufficient to cause the edge 116 of the frusto-conical portion 110 to pass below the horizontal plane passing through the circle defining the center of the convolutions of the annular spring 108 and the spring to embrace the oppositely tapering frusto-conical portion 118 of the pin 104. In contracting, the spring 108, by engagement with the frusto-conical portion 118, snaps the pin 104 from the position shown in Fig. 4 to the position shown in Fig. 5, by which it will be seen that the pin 104 moves a much greater distance than the deflection of the bottom wall of the container caused by the increase in the internal pressure of the can.

The rejecting or discharging means 14 may comprise a lever 120 secured to a vertical shaft 122 journaled in a bracket 124 beyond the periphery of the table 16, the bracket 124 being mounted on any convenient stationary part of the machine, as for example the housing 26, the post 28, or the base 30. The lever 120 is provided at its outer free edge with a block 126 extending into the path of movement of a depressed pin 104 and is also provided with a forward cam surface or edge 128 adapted to engage any such depressed pin 104 so that by the rotation of the turret lever 120 is moved by such pin in a counterclockwise direction as seen in Fig. 7 to the position shown in Fig. 8. The shaft 122 extends vertically above the plane of the table 16 and carries at its upper end the can directing and rejecting arm or lever 130, the lever 130 being fastened to the shaft 122 for oscillation therewith so as to be rotated in a counter-clockwise direction upon the operation of the lever 120 and thereby engage a portion of the defective can above the pocket forming bracket 32 and compel the can in the rotation of the turret to be moved outwardly of the table 16 into the discharge chute or channel 132 as shown in Fig. 8.

The lever 120 is normally retained in the position shown in Fig. 7 by the spring 134 secured at one end to an intermediate portion of the lever and at the other end to a stationary arm 136 formed on the bracket 124 and extending beneath the table 16. An adjustable set screw 138 carried by the stationary arm 136 limits the movement of the lever 120 under the action of the spring 134 and positions the lever in the path of movement of any depressed pin 104.

Other suitable means for expelling defective cans, including electrical as well as mechanical means, may be employed if desired.

Means are provided between the block 126 of the lever 120 and the supply channel or inlet 36 for returning any depressed pin 104 to its normal testing position. Such means may comprise an arcuate cam 140 (Fig. 2) extending in the path of movement of such pin and provided at its forward end with an inclined cam face 142 for engaging and moving such depressed pin upwardly to its normal position shown in Fig. 3. The cam 140 may be mounted on any stationary part of the machine, as for example the housing 26 as shown in Fig. 2. If desired this cam may be extended ot the point at which the cans are fed onto the table 16 so as to provide means locking the pins 104 against downward movement during feeding of the cans onto the table.

The means 12 for discharging properly sealed cans may comprise any suitable or desired form of conveyor or chute providing spaced side bars 144, extending over the table 16 above the pocket forming bracket 32 to receive therebetween cans in these pockets and in the continued rotation of the turret to cause these cans to move out of the pockets and off of the table 16.

The operation of the machine will be apparent from the foregoing description, but may be briefly summarized as follows:

Cans are fed to the table 16 for reception within the pockets 34 along the channel 36 and between the table and the testing units 54 which at this inlet end of the machine are in their upper positions. As the table 16 rotates, the casting 48 rotates therewith and between the inlet of the machine and the lever 120, the stationary cam 92 successively moves the testing units downwardly to bring the yieldable cup 72 of each testing unit into contact with the upper wall of the container and the valve rod 76 into contact with the cap seal 90. This engagement of the valve rod with the cap seal while the rod 58 is moving downwardly causes the valve 70 to move to open position and gas or air under pressure is supplied to the cup 72 and about the cap seal 90. If the cap seal is defective, this air under pressure within the cup 72 will leak into the container, thereby effecting a substantial increase in the internal pressure of the container, and this increase in pressure causes a downward deflection or bulging of the bottom wall of the container. Such downward deflection of the bottom wall causes a downward movement of the pin or block 104 sufficiently to allow the annular spring 108 to snap the pin to its fully lowered position projecting a substantial distance below its normal level. Upon the further rotation of the turret, the depressed pin engages the cam edge 128 of the lever carried block 126, and in moving this lever causes the can associated with the depressed pin to be moved off of the turret and into the can rejecting channel or conveyor 132.

Properly sealed cans will not permit entrance of the air under pressure, and hence the pins 104 associated with such cans will not be depressed, but in reaching the lever carried block 126, will pass thereabove without engaging the block and hence such cans will be fed by the turret between the bars 144 which direct properly sealed cans from the turret. Between the discharge channel 132 for defective cans and the inlet channel 36, the cam 140 engages any depressed pin 104 and returns the same to its normal test position.

As shown in Figure 10 a modified form of feeler device 8' possessing great sensitivity and certainty of operation may comprise a pin 146 pivoted to a block 148 as by pin 150. The block 148 is bifurcated and the pin 146 extends between the furcations thereof and through an opening in the table 16 to which the block 148 is bolted. The pin 146 extends a very slight distance above the upper surface of the table 16 and is provided with a rounded top so as to permit substantially free movement of the cans on the table into position over pin 146, so that the pin engages the bottom end of the can substantially at a central point.

Pin 146 extends beyond the pivoted pin 150 and is formed with an integral counterweight, a portion 152 formed on its inner side and adjacent its lower edge with the latch portion 154.

The block 148 is provided with integral depending apertured portion 156 slidably receiving a plunger 158 urged downwardly by a spring 160 in opposed relation between the plunger and the upper wall of the opening in which the plunger is mounted. The plunger 158 is reduced at its lower end to provide a shoulder 162 adapted to engage the latch portion 154. Upward and downward movement of the plunger 158 is limited by a pin 164 carried by the inner wall of the depending portion 156 and received in an axially extending slot 166 cut in the periphery of the plunger 158. An axially extending port 168 in the plunger 158 maintains the air pressure on the upper and lower end of the plunger substantially equal.

Upon a downward deflection of the bottom wall of a can caused by an increase in the pressure internally in the can, the pin 146 will be depressed, cause a rocking of the counterweight portion 152 and the latch portion 154 in a counter-clockwise direction, thereby releasing the shoulder 162 of the plunger from the latch portion 154. The spring 160 thereupon instantaneously causes a quick movement of the plunger to its lower position wherein it projects a substantial distance below its normal elevated position and when so projected the plunger is positioned to operate the rejecting or discharging means 14 to reject defective or improperly sealed cans from the turret or test conveyor. It will be evident that upon release of the plunger from the latch portion 154, the plunger will move a distance considerably greater than the downward movement of the pin 146, which pin moves a distance corresponding to the deflection of the bottom wall portion of a defectively sealed can into which the gas under pressure has leaked through the sealing cap.

Changes may be made in the form, construction and arrangement of the parts without departing from the spirit of the invention or sacrificing any of its advantages, and the right is hereby reserved to make all such changes, as fairly fall within the scope of the following claims.

The invention is hereby claimed as follows:

1. In a device for detecting leakage at the small sealed filling opening of filled containers, a conveyor, a cup shiftable into engagement with a filled container fed by the conveyor and engaging the container about the said small sealed filling opening of such container, automatic means for supplying gas under pressure to the cup when in engagement with a container, means operatively controlled by the containers being fed by the conveyor and responsive to the deflection of a portion of the wall of a container into which gas under pressure has leaked from said cup for directing from the conveyor, a container the said small filling opening of which is defectively sealed.

2. In a device for detecting leakage at the small sealed filling opening of filled containers, shiftable means including a cup engaging the container about the said small sealed filling opening of such container and a valve projecting in the said cup to engage the container and be moved thereby into open position to supply gas under pressure to the cup when in engagement with the container and means responsive to the deflection of a portion of a wall of a container into which gas under pressure has leaked from said cup for detecting such container the said small filling opening of which is defectively sealed.

3. In a device for detecting leakage at the small sealed filling opening of filled containers, a rotary turret having a plurality of container receiving pockets, a plurality of testing units aligned with said pockets, said testing units being operatively connected with said turret for rotation therewith and for movement parallel to the axis of the turret toward and from the containers in said pockets, means for successively moving said testing units toward and from the containers, each of said units comprising a cup engaging a filled container about the said small sealed filling opening of such container, means supplying air under pressure to the cup of each testing unit for causing air under pressure to leak into any container the said small filling opening of which is defectively sealed, a plurality of can feelers shiftably mounted on the turret and aligned with said pockets each to engage a wall of a container in its associated pocket, a feeler engaging such defectively sealed container being shifted by the deflected wall of such container into which air under pressure has leaked from the cup of the associated testing unit and means operatively controlled by a shifted feeler for impelling off of the turret, a container the said small filling opening of which is defectively sealed.

4. In a device for detecting leakage at the small sealed filling opening of filled containers, means applying gas under pressure about the said small sealed filling opening of each container for forcing gas under pressure into any container the said small filling opening of which is defectively sealed, shiftable means engaging a wall of the container and moved a distance corresponding to the deflection of a portion of a wall of such sealed container into which gas under pressure has leaked, and means operatively controlled by said shiftable means and moved upon such movement of said shiftable means a distance greater than the deflection of the wall portion of the container.

5. In a device for detecting leakage at the small sealed filling opening of filled cans, a support receiving said cans, a cup shiftable into engagement with the can and engaging the can about the said small sealed filling opening, automatic means for supplying air under pressure to the cup when in engagement with the can, a pin, shiftably carried by the support, in position to engage a can when the can is engaged by the cup, means for holding said pin in its normal position to engage the can and for moving the pin a substantial distance to a second position upon deflection of the pin, said pin being deflected by the deflection of a portion of a wall of a can the said small filling opening of which is defectively sealed and into which air under pressure has leaked from said cup, and means operatively controlled by said pin for expelling such defective cans from the support.

6. In a device for detecting leakage at the small sealed filling opening of filled containers, means applying gas under pressure about the said small sealed filling opening of each container for forcing gas under pressure into any container the said small filling opening of which is defectively sealed, a pivoted member engaging a wall of the container and moved an angular distance corresponding to the deflection of a portion of a wall of such defectively sealed container into which gas under pressure has leaked, a latch operatively connected to said pivoted member, and a spring pressed member engaging said latch, whereby upon movement of the pivoted member said spring pressed member is released for automatic movement a distance substantially greater than the movement of the pivoted member.

7. In a device for detecting leakage at the small sealed filling opening of filled containers, a cup shiftable into engagement with the wall of the container about the said small sealed filling opening, means for supplying gas under pressure to the cup when in engagement with a container, means operative while gas is supplied to said small sealed opening by said gas supplying means for detecting a container the said small filling opening of which is defectively sealed, said last-named means being responsive to the deflection of a portion of a wall of a container the said small filling opening of which is defectively sealed and into which gas under pressure has leaked from said cup.

8. In a device for detecting leakage at the small sealed filling opening of filled containers, means for supplying gas locally about said small sealed filling opening, said means for supplying gas including means for supplying the gas under a pressure sufficient to cause the gas to leak into any container the said small filling opening of which is defectively sealed and means for testing the containers for abnormally high internal pressure, whereby to detect any such defectively sealed containers.

9. In a device for detecting leaks at the small sealed filling opening of filled containers, means applying gas under pressure locally about said small sealed filling opening of each container for forcing gas under pressure into any container the said small filling opening of which is defectively sealed, a pin, means shiftably carrying said pin in position to engage a bulgable wall portion of a container to which gas has been applied by said gas applying means, means for resiliently retaining said pin in its normal position and for moving said pin a substantial additional distance to a second position upon a deflection of said pin by a deflection of said bulgable wall portion.

10. In a device for detecting leaks at the small sealed filling opening of filled containers, means applying gas under pressure locally about said small sealed filling opening of each container for forcing gas under pressure into any container the said small filling opening of which is defectively sealed, a pin, means shiftably carrying said pin in position to engage a bulgable wall portion of a container to which gas has been applied by said gas applying means, means for resiliently retaining said pin in its normal position and for moving said pin a substantial additional distance to a second position upon a deflection of said pin by a deflection of said bulgable wall portion, said means for resiliently retaining and moving said pin including a member rigid with said pin and having a pair of intersecting conical surfaces thereon concentric with said pin and of increasing diameter in a direction axially inwardly from the ends of said pin to their line of intersection and an angular resilient member engaging said conical surfaces and supported against movement axially of said pin by said means carrying said pin.

11. In a device for detecting leaks in a localized portion of filled, sealed containers, means for applying to the external surface of said localized portion of each container a gas at a pressure exceeding the external pressure effective on a second, bulgeable portion of the same container whereby there is built up in a container having a leak in said localized portion an internal pressure exceeding the external pressure effective against the bulgeable wall portion to bulge said bulgeable wall portion of a container having a leak in said localized portion, and means responsive to a bulge in said bulgeable portion of the container for detecting containers which have a leak in said localized portion.

12. In a device for testing filled, sealed containers for leakage in a localized portion thereof, means for applying to said localized portion of a filled, sealed container a gas under a pressure sufficient to cause the gas to enter the filled, sealed container if a leak exists in said localized portion in an amount sufficient to create an abnormally high, internal pressure in the container, and means for testing said filled and sealed container for abnormally high, internal pressure whereby to determine whether there is a leak in said localized portion of the container.

ROY O. HENSZEY.